United States Patent [19]

Breeze et al.

[11] Patent Number: 4,519,013
[45] Date of Patent: May 21, 1985

[54] ASSEMBLIES OF ELECTRICAL OR ELECTRONIC APPARATUS

[75] Inventors: Gerald D. Breeze, West Midlands; Donald C. Elliott, Warwick, both of England

[73] Assignee: The General Electric Company, p.l.c., England

[21] Appl. No.: 384,336

[22] Filed: Jun. 2, 1982

[30] Foreign Application Priority Data

Jun. 9, 1981 [GB] United Kingdom ............... 8117626

[51] Int. Cl.³ .............................................. H05K 7/20
[52] U.S. Cl. ................................. 361/384; 174/16 R; 211/26; 361/429
[58] Field of Search ............... 361/380, 381, 384, 388, 361/389, 427, 429; 165/73, 74, 75, 104.33, 129, 131; 174/16 R; 211/26, 189, 87; 248/220.3, 221.1; 312/236

[56] References Cited

U.S. PATENT DOCUMENTS

| 3,356,903 | 12/1967 | Arnold et al. | 361/384 |
|---|---|---|---|
| 3,387,648 | 6/1968 | Ward et al. | 361/384 |
| 3,602,774 | 8/1971 | Grant | 361/384 |
| 3,697,815 | 10/1972 | Grant et al. | 361/384 |
| 4,296,455 | 10/1981 | Leaycraft et al. | 361/386 |
| 4,403,271 | 9/1983 | Flanigan | 361/383 |

FOREIGN PATENT DOCUMENTS

| 266592 | 2/1975 | Australia | 361/381 |
|---|---|---|---|
| 2613366 | 3/1976 | Fed. Rep. of Germany | 361/384 |
| 2635445 | 6/1976 | Fed. Rep. of Germany | 361/384 |
| 147182 | 3/1981 | German Democratic Rep. | 361/384 |
| 2138376 | 8/1973 | Netherlands | 361/384 |
| 2062970 | 5/1981 | United Kingdom . | |
| 700941 | 12/1979 | U.S.S.R. | 361/384 |

OTHER PUBLICATIONS

IBM Technical Disclosure Bulletin, vol. 17, No. 9, Feb. 1975, p. 2529.

Primary Examiner—Patrick R. Salce
Assistant Examiner—Gregory D. Thompson
Attorney, Agent, or Firm—Kirschstein, Kirschstein, Ottinger & Israel

[57] ABSTRACT

As assembly in which individual units of electrical or electronic apparatus are attached to one side of a perforated vertical wall and a cooling channel is formed on the other side of the wall. Two parallel vertical walls each having apparatus attached to their outer sides may form a cooling passage or chimney between them. The flow of air into the passage may be directed by one or more inclined deflector plates, and the flow of air to the apparatus or within the passage may be enhanced by fans.

7 Claims, 8 Drawing Figures

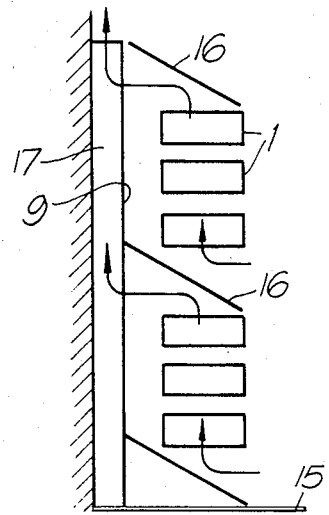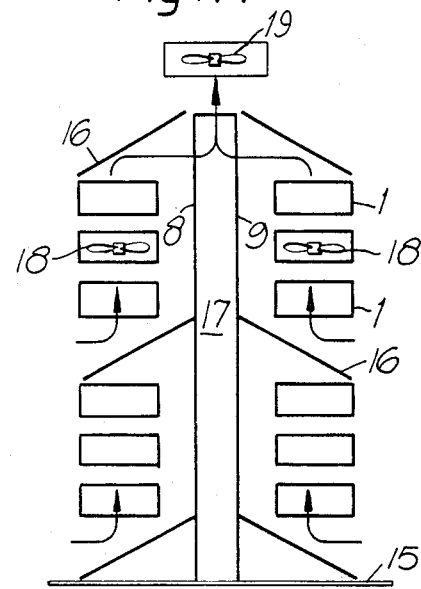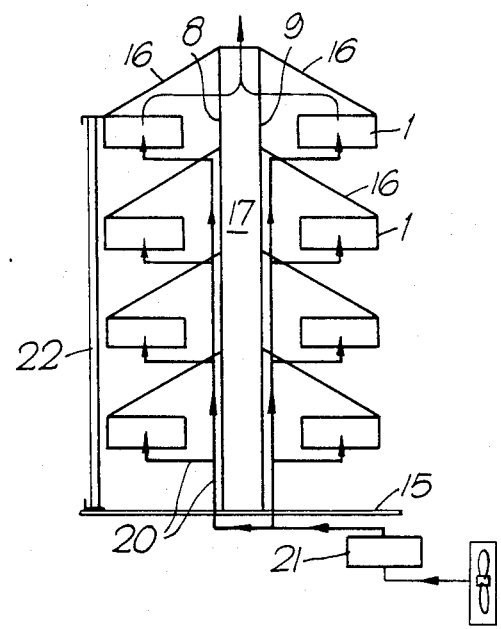

ASSEMBLIES OF ELECTRICAL OR ELECTRONIC APPARATUS

BACKGROUND OF THE INVENTION

1. Field of the Invention

The present invention relates to assemblies of electrical or electronic apparatus.

SUMMARY OF THE INVENTION

2. Features of the Invention

According to the present invention an assembly of electrical or electronic apparatus comprises a substantially vertical planar support member having therein over at least part of its area an array of apertures, structure arranged to cooperate with some at least of the apertures to attach one or more units of said electrical or electronic apparatus to one side of the support member, and structure on the other side of the support member and forming with the support member a substantially vertical path for the passage of air to or from the one or more units of apparatus, by way of some at least of the apertures, for the cooling of the apparatus in operation.

According to another aspect of the present invention an assembly of electrical or electronic apparatus comprises a pair of substantially vertical planar support members supported on and separated by two or more substantially vertical column members, each of the support members having therein over at least a part of its area an array of apertures, structure arranged to cooperate with some at least of the apertures to attach one or more units of the electrical or electronic apparatus to at least one of the support members, and means including the volume between the support members and an adjacent pair of the column members to define a path for cooling air to or from the units of apparatus.

BRIEF DESCRIPTION OF THE INVENTION

Preferably there is provided above a unit of the apparatus or above a group of units a substantially planar member attached to the respective support member and inclined so as to channel air rising from the unit or group of units through the apertures into the path. One or more fans may be provided to enhance the flow of air to said unit or group of units and/or the flow or air within said path. Air flowing to the unit or group of units may first be cooled by means of a heat exchanger, and may be ducted within the units towards particular heat generating or temperature sensitive components.

BRIEF DESCRIPTION OF THE DRAWINGS

An assembly of electrical or electronic apparatus, in accordance with the present invention, will now be described with reference to the accompanying drawings, of which:

FIGS. 6, 7 and 8 show schematically respective views of parts of the apparatus.

DESCRIPTION OF THE PREFERRED EMBODIMENTS

Figure 1:
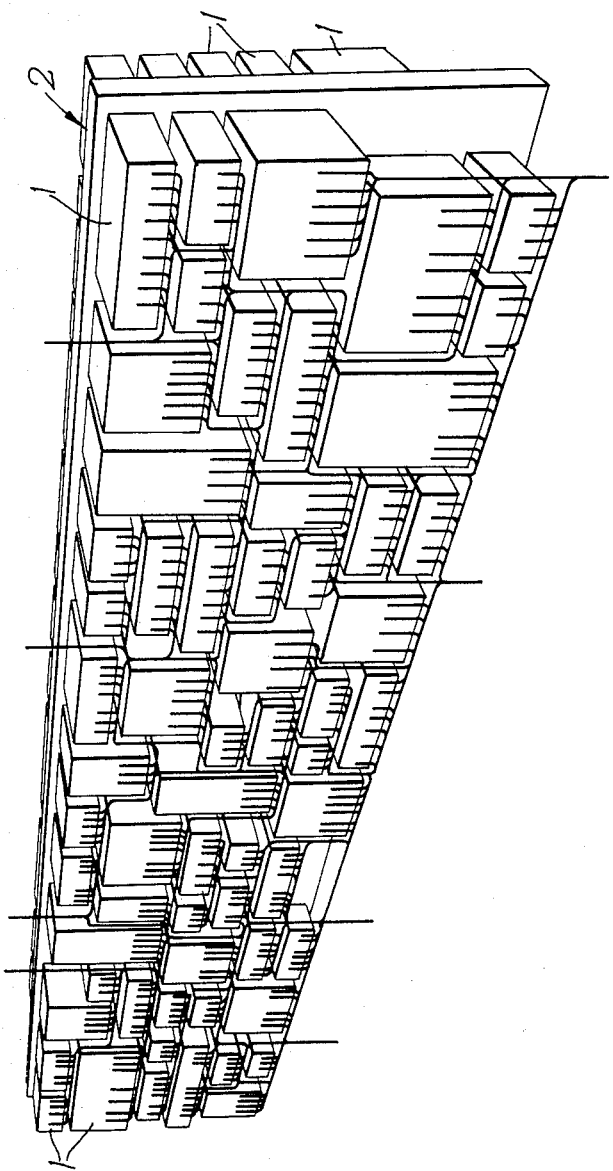
FIG. 1 shows schematically an assembly of the apparatus.

Referring first to FIG. 1 individual functional units 1 of an assembly of the apparatus are arranged to be attached on either side of a double-sided support wall 2, with the interconnections between the units 1, and the external connections to the apparatus, being provided at the front faces of the units 1, that is, at the faces remote from the support wall 2. These interconnections and external connections may be made by way of modular plug and socket connectors (not shown), including for example coaxial cable connectors, optical fibre couplings, power input connectors and multi-pin connectors having, say, 2.5 millimeter pin spacing in a 7 by 3 matrix. The multi-pin connectors may be compatible with reverse DIN connectors (not shown) provided at the rear of a unit 1 for connections between individual circuit boards of the unit 1.

A unit 1 may be of a height to house standard single or double height "Euro-card" printed circuit boards, and of virtually any reasonable width to accommodate the required number of circuit boards.

Figure 2:
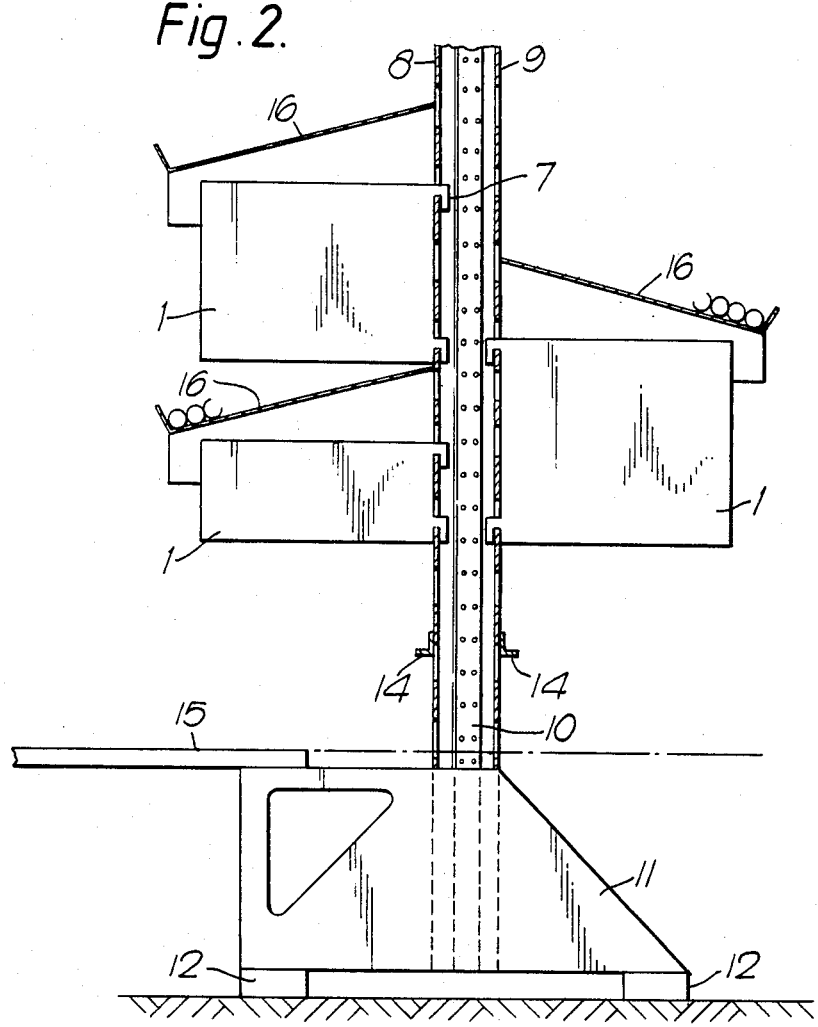
FIGS. 2 and 3 show respective detail views of parts of the apparatus.
Figure 3:
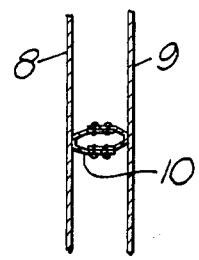
Figure 4:
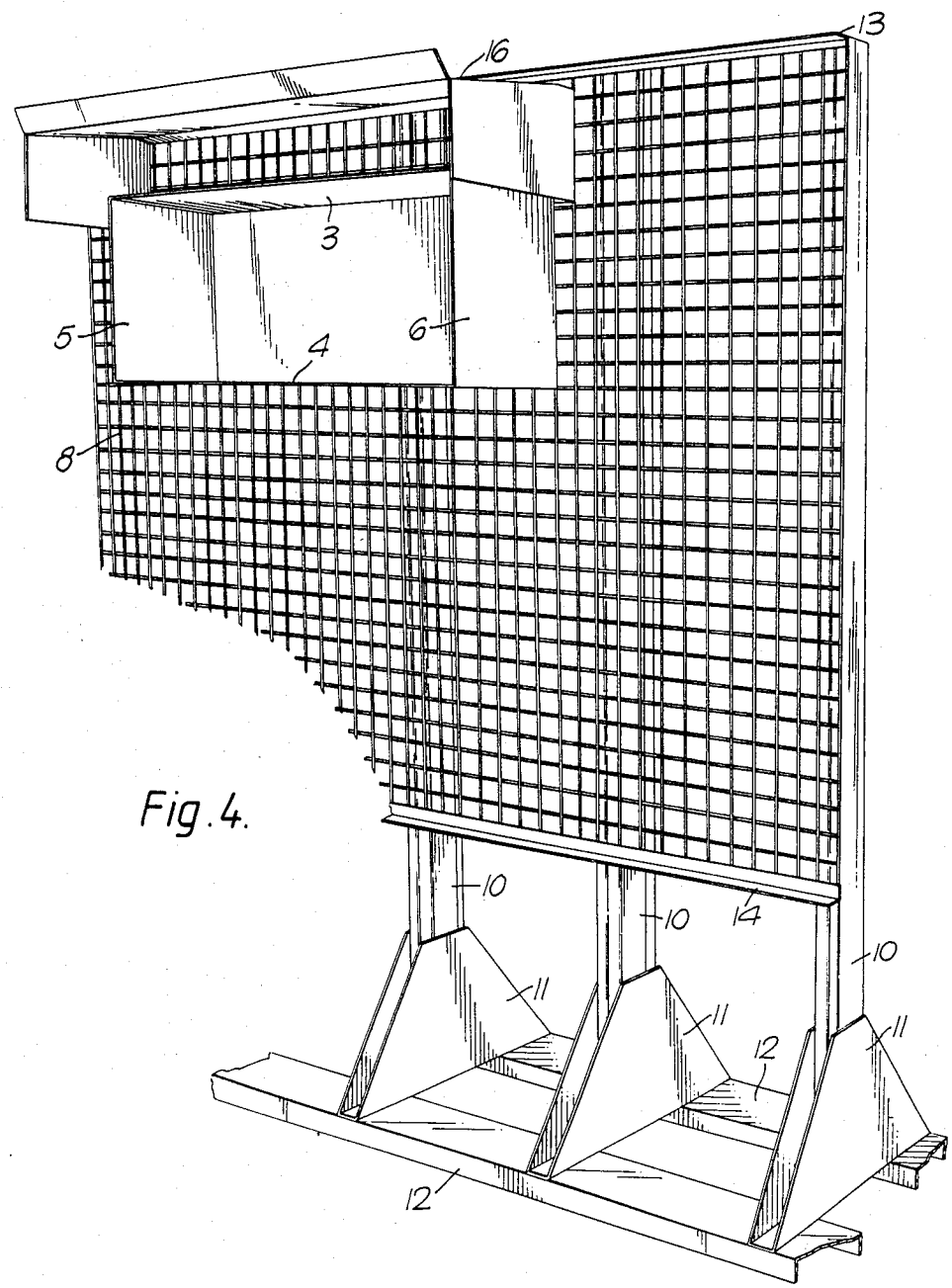
FIG. 4 shows a part of the apparatus in detail.

Referring also to FIGS. 2 to 4 each unit 1 comprises effectively an open-fronted box having generally planar upper and lower faces 3 and 4, which carry guides (not shown) for the printed circuit boards (not shown) and which may be pierced for ventilation purposes, and end faces 5 and 6 which are provided with rearwardly extending lugs 7 by which the unit is attached to the support wall 2.

The rear face of the unit 1, adjacent the support wall 2, may either comprise simply a set of plug and socket connectors (not shown), supported by the faces 3 to 6, for interconnecting the individual printed circuit boards, or may comprise a back plane member. This back plane member, which may be of metal but is preferably of an electrically insulating material such as resin-impregnated glass-fibre board, in turn may support the required plug and socket connectors. In the case of an insulating board it may also carry "printed" wiring for interconnecting the plug and socket connectors.

Figure 5:
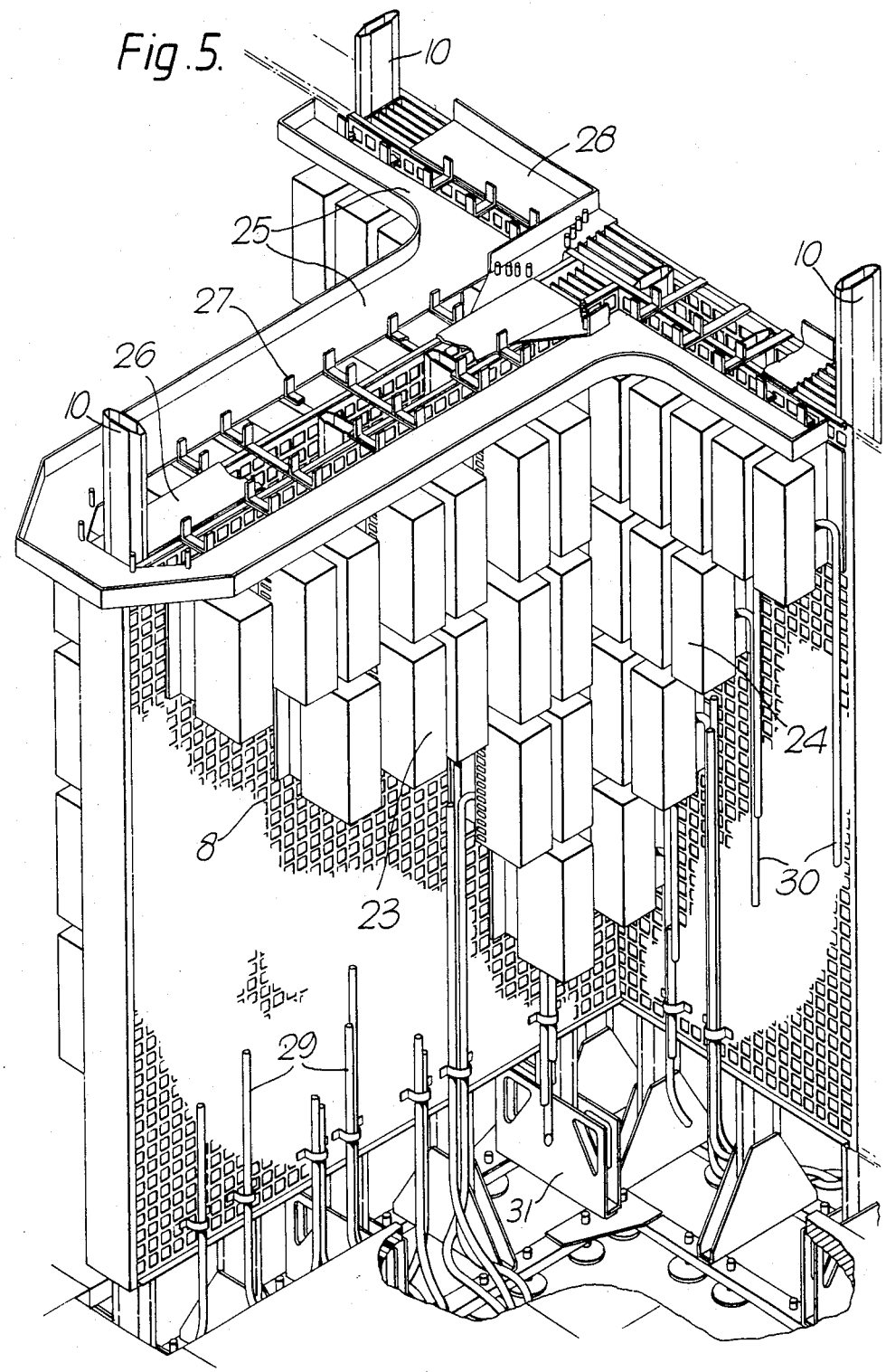
FIG. 5 shows another part of the apparatus in detail.

The support wall 2 comprises two substantially planar members 8 and 9 which are secured, for example by rivetting, to vertical columns 10. The members 8 and 9 may be of mild steel or stainless steel sheet having a regular array of square holes punched therein, as shown in FIG. 5, these holes being at approximately 3 centimeters pitch. Alternatively the members 8 and 9 may be formed as orthogonal arrays of mild steel rods or wires at approximately 3 centimeters pitch, the rods or wires being welded together at their crossing points, as shown in FIG. 4.

As shown in FIG. 3 each of the columns 10 is fabricated from two channel sections rivetted together to provide a hollow, flattened octagonal section, the narrow faces of this octagonal section column being rivetted to the punched-sheet wall members 8 and 9 and the broader faces being rivetted to generally triangular base supports 11. These supports 11 in turn are secured to inverted channel-section members 12 which run longitudinally to interconnect the support members 11 of all the columns 10 in the wall 2. The longitudinal members 12 may be provided with levelling bolts (not shown) and with means (not shown) to secure the structure to the floor.

The upper and lower edges of the wall members 8 and 9 may be stiffened by horizontal angle members 13 and 14. The floor 15 may either be supported independently of the apparatus supporting structure or may rest on beams (not shown) secured to the base supports 11.

The lugs 7 on the end faces 5 and 6 of the units 1 are arranged to hook over the lower edges of respective holes in the wall members 8 and 9, and it will be appreciated that because of the "open-mesh" nature of the wall members 8 and 9 units 1 can be of virtually any width, without restriction to a multiple of a basic unit width.

Referring now to FIGS. 6, 7 and 8, above each unit 1, or above a column of units 1, there may be provided an inclined airflow deflector 16 by means of which rising air warmed by heat dissipation within the units 1 may be deflected through the holes in the respective wall member 8 or 9 into the space between the wall members 8 and 9. This space may act as a chimney 17 for the rising air. If necessary some of the holes in the wall members 8 and 9 may be blanked off to increase the effectiveness of the chimney.

Forced ventilation may be provided for individual units 1 by providing ventilating fans 18 within or associated with these units 1, or an extractor fan 19 may be provided at the top of the chimney 17. If greater heat dissipation is to be met inlet and extractor fans may be provided, or cool air from a service unit, for example beneath the floor 15, may be ducted to individual areas within the units 1 by way of ducts 20 and extracted by way of the deflectors 16 and the chimney 17.

If the ambient temperature is too high the service unit may include a heat exchanger 21.

The outer or front edges of the air deflectors 16 may be bent upwards to act as cable supports for the interunit wiring.

Where any particular component or set of components is required to dissipate a considerable amount of heat this component or set of components may be mounted on an individual circuit board (not shown) which is attached to a wall member 8 or 9 so as to lie generally parallel to that wall member.

The smaller functional units 1 of future apparatus will in general not be as deep as existing rack shelves. Where existing shelf-mounted functional units are to be used in conjunction with wall mounted units as described above sections of the members 8 and 9 may be omitted or removed and the shelf-mounted units (not shown) mounted directly between columns 10 so as to project on either side of the wall 2. The columns 10 may be spaced at suitable distances from one another to accommodate existing standard-width shelves, or auxiliary columns or part columns (not shown) may be provided to frame the openings in the wall 2.

Once the suite of apparatus is installed and commissioned the front faces may be covered by sliding or hinged doors 22 (FIG. 8) which may serve the additional purpose of channelling cooling airflow.

It will be appreciated that with the flexibility offered by the apparatus described above the interunit cable spacing can be adjusted to meet requirements simply by positioning the units as required on the wall 2, and units can also be positioned to optimise cable runs. Functional units 1 can be subdivided if necessary to avoid high heat concentrations. At the same time a standardised approach may be used to meet the requirements of a large scale installation such as a main exchange.

Since the support wall 2 and the members 11 and 12 support the associated suite of apparatus as a unified assembly the apparatus can be mounted and tested in the factory and then transported to its intended site ready for use.

The welded-wire form of support wall member 8 or 9 may be particularly useful where large numbers of insulated wires would be threaded through the mesh of the wall 2. The rounded surfaces of the wires avoid undesirable insulation cutting or stripping.

The structure described above is to a great extent amendable to production by numerically controlled stamping machines. The wall 2 may be produced in any required size from, say, the order of a meter square upwards.

Referring now in particular to FIG. 5 line termination units 23 and exchange termination units 24 may form a major part of a suite of exchange apparatus, particularly as the development of smaller and smaller electronic units 1 proceeds. One or more laterally extending sections of wall, as shown in FIG. 5, may therefore be provided to minimise space requirements and to keep inter unit wiring as short as possible.

Trays 25 may be provided to route local wiring or "jumpers" between line and exchange termination units 23 and 24 respectively within the section, while a central tray 26 accommodates wiring running between line termination units 23 to main wiring paths at the rear face of the section (not shown). Turning posts 27 may be provided for wires leaving the cable trays 25 and 26. Trays 28 accommodate non-local wiring from exchange termination units 24 to the main wiring paths (not shown). Line cables 29 and exchange cables 30 may either be routed beneath the flooring 15, as shown in FIG. 5, or may be routed by way of overhead trays or mesh (not shown) supported on extended column members 10. The edges of the floor 15 may be supported on generally rectangular supports 31 used in place of some of the supports 11.

We claim:

1. An assembly of electrical or electronic apparatus comprising a vertical planar support member having therein over at least part of its area an array of apertures, at least one unit of electrical or electronic apparatus, means extending from said one unit into at least some of said apertures to attach said one unit on one side of said support member, a planar deflector member, means to attach said deflector member above said one unit at an angle to said support member so as to channel air rising from said one unit through at least some of said apertures, and vertical column means on the other side of said support member forming with said support member a vertical path for the passage of air so channelled from said one unit of the apparatus for the cooling of said apparatus in operation.

2. An assembly of electrical or electronic apparatus comprising at least two substantially vertical column members, a pair of vertical planar support members supported on and separated by said vertical column members, each of said support members having therein over at least a part of its area an array of apertures, at least one unit of electrical or electronic apparatus, means extending from said one unit into at least one of said apertures to attach said one unit to one of said support members, a planar deflector member, means to attach said deflector member above said one unit at an angle to said one support member so as to channel air rising from said one unit through at least some of said apertures in said one support member, and said support members and an adjacent pair of said vertical column members defining a vertical path for the passage of air so channelled from said one unit of the apparatus for the cooling of said apparatus in operation.

3. An assembly in accordance with claim 2 wherein a fan is provided in said vertical path to enhance the flow of air within said vertical path.

4. An assembly in accordance with claim 2 wherein a fan is provided to enhance the flow of air within said one unit of the apparatus.

5. An assembly in accordance with claim 2 wherein air is ducted to said one unit of the apparatus.

6. An assembly in accordance with claim 5 wherein the air ducted to said one unit of the apparatus is first cooled by means of a heat exchanger.

7. An assembly in accordance with claim 2 wherein said deflector member has an upwardly bent front outer edge supporting wiring between said one unit of the apparatus and another unit of the apparatus.

* * * * *